United States Patent [19]

Apple, Sr.

[11] 3,938,900

[45] Feb. 17, 1976

[54] TUBE JOINING SYSTEM

[75] Inventor: Charles N. Apple, Sr., Greensboro, N.C.

[73] Assignee: Metafab Industries, Inc., Greensboro, N.C.

[22] Filed: Feb. 11, 1974

[21] Appl. No.: 441,035

[52] U.S. Cl. ............... 403/263; 403/382; 211/182
[51] Int. Cl. ........................................... E04g 7/00
[58] Field of Search ........... 403/219, 218, 217, 231, 403/382, 403, 240, 263; 52/758 H, 753 D, 752, 280; 211/182, 177

[56] References Cited
UNITED STATES PATENTS

| | | | |
|---|---|---|---|
| 1,630,492 | 5/1927 | Kusterle | 403/217 |
| 1,763,748 | 6/1930 | Best | 211/177 UX |
| 2,097,172 | 10/1937 | Yurkovitch | 403/219 |
| 3,062,571 | 11/1962 | Goldman | 403/263 |
| 3,510,159 | 5/1970 | Waag et al. | 403/263 |
| 3,839,825 | 10/1974 | Nica | 403/218 |

FOREIGN PATENTS OR APPLICATIONS

| | | | |
|---|---|---|---|
| 63,474 | 4/1955 | France | 403/218 |
| 219,791 | 2/1962 | Austria | 403/231 |

Primary Examiner—Andrew V. Kundrat

[57] ABSTRACT

A system for joining two or more members, at least one of which is tubular, wherein at least the longitudinal axis of the tubular member is out of alignment with the longitudinal axis of another member. The tubular member is provided with an opening for receiving a portion of another member and a fastener assembly is located within the tubular member for rigidly securing together the members.

5 Claims, 4 Drawing Figures

TUBE JOINING SYSTEM

BRIEF SUMMARY AND OBJECTS OF THE INVENTION

This invention relates to the joining together of two or more members wherein one of the members is tubular or at least includes a hollow section.

It has been the conventional practice for a number of years to join tubing members such as used in furniture including tables, chairs, bookshelves, displays, etc. by welding, brazing or soldering. Joints formed by such methods must be refinished prior to plating or painting. Such operations are costly and time consuming. Means for connecting tubing other than by welding, etc. are the subjects of U.S. Pat. Nos. 3,353,853 and 3,556,569. A new and improved tube joining system is disclosed in applicant's copending U.S. application Ser. No. 295,182, filed Oct. 5, 1972.

In the present invention, the tubular members are painted or plated prior to being formed into various furniture components, etc. Construction in this manner eliminates damage to the finished surfaces of the tubular members. In addition, all fastener assemblies securing tubular members together to form a joint are completely enclosed within the tubular members. The present invention also is directed to joints formed from two or more members which may be of square, rectangular or round cross-sectional configurations.

Briefly, the tube joining system of the present invention provides for a plurality of tubes to be angularly disposed relative to each other and rigidly connected by a concealed fastener assembly. In a preferred embodiment, a first tubular member has at least one opening therein for receiving an end portion of a second member, which may be tubular, and a fastener assembly housed within the first tubular member for rigidly, releasably securing together the two members. While the second member has been described as tubular, such member could be of solid construction, having an opening for receiving a portion of the fastener assembly. The fastener assembly includes a plate member frictionally engaging the inner periphery of the first tubular member and a fastener which passes through the second member and is threaded to the plate member. In the event two or more members extend through openings in the first tubular member for rigid attachment thereto, the two members may be provided with interlocking or overlapping portions, with a portion of the fastener passing through both members. The members extending through openings in the tubular member may be in the form of elongated tubes or relatively short stem members, as disclosed in applicant's copending U.S. application Ser. No. 295,182.

One of the primary objects of the invention is the provision of a new and improved system for joining a plurality of members with the longitudinal axes out of alignment, wherein at least a portion of one member is hollow or tubular.

Another object of the invention is the provision of a novel joint and a method of rigidly joining two members in an angular relationship wherein an assembly for joining the members is completely enclosed within one of the members.

A further object of the invention is the provision of a system for joining a plurality of members readily and economically without damage to the finished surface of the members.

Another object of the invention is the provision of a new and improved joining system for a plurality of members of different cross-sectional configurations.

Other objects and advantages of the invention will become apparent when considered in view of the following detailed description.

DETAILED DESCRIPTION OF THE INVENTION

Figure 1:
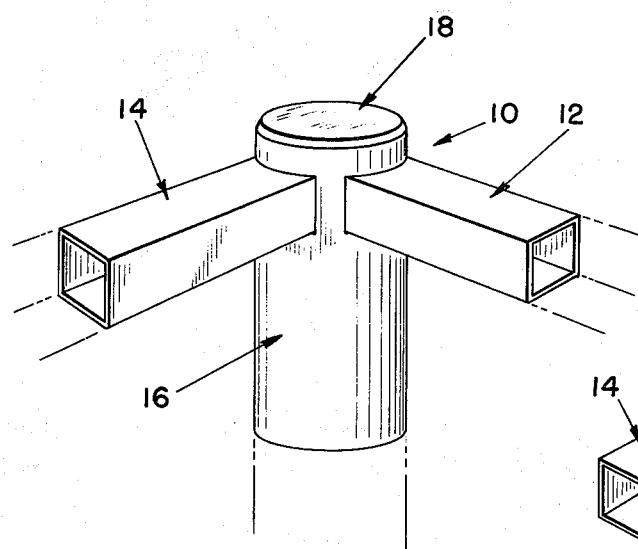
FIG. 1 is a fragmentary, perspective view of one embodiment of the invention wherein a plurality of square tubular members are rigidly secured to a round tubular member.

Referring to the drawing, FIG. 1 represents one embodiment of a joint embodying the invention. The joint 10 consists of two members 12 and 14 rigidly coupled to a member 16 by a concealed fastener assembly. The members 12, 14 and 16 may be sections of tubing such as used in metal furniture. Alternatively, the members 12 and 14 may be of solid construction and member 16 may be provided with a hollow end portion to receive the members 12 and 14. While the drawing illustrates two members 12, 14 secured to tubular member 16, it is to be understood that only one member or three or more members may be fixed to the tubular member 16 in a similar manner.

The open end of the tube 16 may be closed by a cap 18. Preferably the cap is of plastic construction, however, it may be formed of other suitable opaque or transparent materials of various constructions and configurations, depending upon the cross-sectional configuration of tubular member 16.

Figure 2:
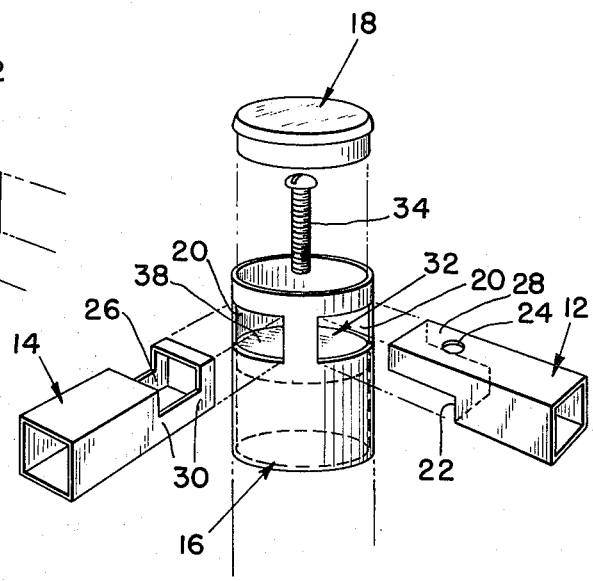
FIG. 2 is an exploded, perspective view similar to FIG. 1 illustrating the fastener assembly, the overlapping or interconnection sections of the two members, the tubular member having openings for receiving the two members, and a cap for the end of the tubular member.
Figure 4:
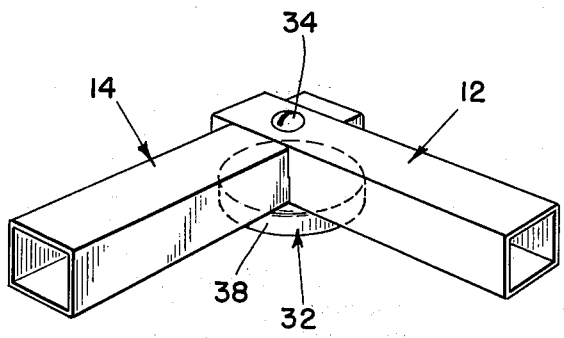
FIG. 4 is a perspective view of two interlocked or overlapped members retained in position by the fastener assembly and removed from the tubular member.
Figure 3:
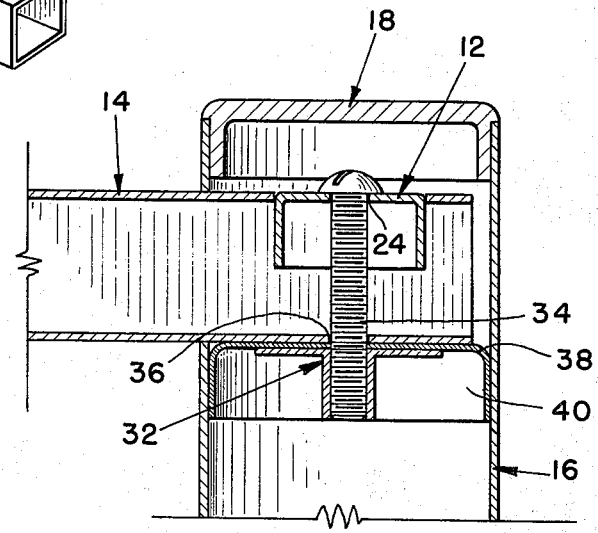
FIG. 3 is an enlarged, cross-sectional view of the joint formed by the three members and the fastener assembly.

In the embodiment illustrated, each of members 12, 14 is of square tubing which extends through square apertures 24 formed in the peripheral wall of round tubing member 16. The exterior dimensions of members 12 or 14 conform in size to the apertures 20 to form a relatively tight fit with the tubular member 16. The end of member 12 which is inserted through an opening 20 has a portion cut away to define a shoulder 22 and also is provided with a opening 24 drilled therein, as shown by FIG. 2. A portion of member 14 to be positioned within the tubular member 16 has a portion cut away to define a slot or notch 26 which is spaced from the end of such member. After inserting the notched end portion of member 14 into the tube 16 through an opening 20, the member 12, having a portion removed from one end, is inserted through another aperture or opening with a portion 28 extending through the notch 26 of member 14 and with shoulder 22 abutting the surface area 30 of member 14. FIGS. 3 and 4 illustrate the interlocked positions of members 12 and 14.

The ends of members 12 and 14 are retained within and secured to tubular member 16 by a fastener assembly 32. The assembly includes a bolt 34 which extends through opening 24 and member 12, opening 36 and member 14, and is threadably secured to the plate or cup member 38. The member 38 may be of solid construction having an opening for threadably receiving the bolt 34, or may be cup-shaped, as shown by FIG. 3, including a peripheral flange portion 40, the outer surface of which substantially corresponds in size to the internal diameter of the tubular member 16. The thickness of a plate 38 of solid construction or the length of the flange portion 40, FIG. 3 may vary depending upon the desired results. In addition, a second member 38 may be positioned on the opposite side of the tube member 12, 14 for receiving the bolt 34 if so desired.

In the embodiment illustrated, the joint is formed by providing the desired number of openings in tube 16 and providing the notches, shoulders, apertures, etc., in members 12 and 14. The plate or cup-shaped member 38 is placed in the tube 16, member 14 is inserted through an opening 20 and member 12 is inserted through another opening 20 with the projecting portion 28 of members 12 extending into notch 26 of member 14. Bolt 34 is placed through tube members 12, 14 and threaded into plate or cup member 38. Cap 18 then is applied to the end of the tubular member 16.

Due to the sizes of the plate 38, the sizes of openings 20 and exterior dimensions of tube 12, 14, and the fact that the outermost edges of the tubes 12, 14 abut the inner periphery of the tube 16, firm and rigid attachment of members 12 and 14 to member 16 is provided.

The members 12, 14, 16 and 18 may be of various geometric configurations and cross-sections.

I claim:

1. A joint formed from a plurality of members wherein the longitudinal axis of the members are out of alignment comprising; a first tubular member having an exterior surface defining at least one opening therein and an inner periphery, a second tubular member having an end portion extending through said opening into said first member toward the inner peripheral surface thereof, and means within said first member for releasably securing said first member to said second member including a first fastener member having a peripheral surface in abutting relation with said inner periphery of said member, and a second fastener member extending axially along said first tubular member and extending through said second member cooperatively coupled to said first fastener member for securing said first and second members together, said first fastener member is cup shaped and having a surface abutting said second member, and a peripheral surface extending axially of said first tubular member, and an aperture threadably receiving the end of said second fastener member within the cup.

2. A joint as defined in claim 1, wherein the dimensions of said opening correspond substantially with the exterior cross-sectional dimensions of said second member.

3. A joint as defined in claim 1, wherein a plurality of openings are provided in said first tubular member, and further including a third member extending through an opening in said first member.

4. A joint as defined in claim 3, wherein said second member and said third member are interlocked within said first member.

5. A joint as defined in claim 4, wherein one member of said second and third members defines a recess for receiving a portion of the other member of said first and third members.

* * * * *